United States Patent
El-Hibri et al.

(10) Patent No.: US 11,591,451 B2
(45) Date of Patent: Feb. 28, 2023

(54) POLY(ARYL ETHER KETONE) (PAEK) COMPOSITIONS INCLUDING A LOW MOLECULAR WEIGHT AROMATIC COMPOUND

(71) Applicant: SOLVAY SPECIALTY POLYMERS USA, LLC, Alpharetta, GA (US)

(72) Inventors: Mohammad Jamal El-Hibri, Atlanta, GA (US); Chantal Louis, Alpharetta, GA (US); David B. Thomas, Atlanta, GA (US)

(73) Assignee: SOLVAY SPECIALTY POLYMERS, LLC, Alpharetta, GA (US)

( * ) Notice: Subject to any disclaimer, the term of this patent is extended or adjusted under 35 U.S.C. 154(b) by 1061 days.

(21) Appl. No.: 16/321,943

(22) PCT Filed: Aug. 1, 2017

(86) PCT No.: PCT/EP2017/069472
§ 371 (c)(1),
(2) Date: Jan. 30, 2019

(87) PCT Pub. No.: WO2018/024744
PCT Pub. Date: Feb. 8, 2018

(65) Prior Publication Data
US 2020/0181360 A1 Jun. 11, 2020

Related U.S. Application Data

(60) Provisional application No. 62/472,703, filed on Mar. 17, 2017, provisional application No. 62/370,008, filed on Aug. 2, 2016.

(30) Foreign Application Priority Data

Jan. 13, 2017 (EP) .................................... 17151497

(51) Int. Cl.
| | | |
|---|---|---|
| *C08K 5/07* | (2006.01) | |
| *B32B 15/08* | (2006.01) | |
| *C08G 65/40* | (2006.01) | |
| *C08K 5/41* | (2006.01) | |
| *C08K 7/14* | (2006.01) | |
| *C09J 5/00* | (2006.01) | |
| *C09J 171/00* | (2006.01) | |

(52) U.S. Cl.
CPC .............. *C08K 5/07* (2013.01); *B32B 15/08* (2013.01); *C08G 65/4012* (2013.01); *C08K 5/41* (2013.01); *C08K 7/14* (2013.01); *C09J 5/00* (2013.01); *C09J 171/00* (2013.01); *C08G 2650/40* (2013.01); *C09J 2400/163* (2013.01); *C09J 2471/00* (2013.01)

(58) Field of Classification Search
CPC combination set(s) only.
See application file for complete search history.

(56) References Cited

U.S. PATENT DOCUMENTS

| | | | |
|---|---|---|---|
| 10,301,432 B2 * | 5/2019 | Taylor | .................. B01D 71/68 |
| 2011/0104417 A1 | 5/2011 | Wang et al. | |
| 2013/0052897 A1 | 2/2013 | Rogers et al. | |
| 2016/0152769 A1 | 6/2016 | Wilson et al. | |

FOREIGN PATENT DOCUMENTS

| | | |
|---|---|---|
| EP | 1559542 A1 | 8/2005 |
| EP | 1459882 B1 | 2/2010 |
| WO | 2011123790 A1 | 10/2011 |
| WO | 2016092087 A1 | 6/2016 |

OTHER PUBLICATIONS

Standard ASTM D1002-10, "Standard Test Method for Apparent Shear Strength of Single-Lap-Joint Adhesively Bonded Metal Specimens by Tension Loading (Metal-to-Metal)", 2010, p. 1-6.
Standard ASTM D3418-08, "Standard Test Method for Transition Temperatures and Enthalpies of Fusion and Crystallization of Polymers by Differential Scanning Calorimetry", 2008, p. 1-7.

* cited by examiner

*Primary Examiner* — Daniel H Lee
(74) *Attorney, Agent, or Firm* — Osha Bergman Watanabe & Burton LLP

(57) ABSTRACT

A polymer composition includes at least one poly(aryl ether ketone) (PAEK) component and at least one low molecular weight aromatic compound. A polymer metal junction including the polymer composition and a method of making a polymer metal junction are also described.

15 Claims, No Drawings

POLY(ARYL ETHER KETONE) (PAEK) COMPOSITIONS INCLUDING A LOW MOLECULAR WEIGHT AROMATIC COMPOUND

CROSS-REFERENCE TO RELATED APPLICATIONS

This application is a U.S. national stage entry under 35 U.S.C. § 371 of International Application No. PCT/EP2017/069472 filed Aug. 1, 2017, which claims priority to U.S. Provisional Application No. 62/370,008, filed Aug. 2, 2016, European Application No. EP 17151497.9, filed Jan. 13, 2017, and U.S. Provisional Application No. 62/472,703, filed Mar. 17, 2017, each of which is incorporated herein by reference in its entirety.

FIELD OF THE INVENTION

The present invention relates to a polymer composition and a polymer-metal junction including the polymer composition, the polymer composition including a poly(aryl ether ketone) (PAEK) component and at least one low molecular weight aromatic compound.

BACKGROUND

The need to adhere polymer resins to metal surfaces exists in a wide variety of fields, including, for example, automotive, electrical, and mobile electronic device fields.

PAEKs are highly crystalline and are used in a wide range of applications where there is a need for high temperature performance and good chemical resistance. However, PAEKs may exhibit poor adhesion to metals.

Although adhesives have been used, methods for bonding polymers to metal without the use of adhesives have also been described. One such class of methods involves nano-etching the metal to create a nano-structured surface prior to contacting the metal with the polymer as described, for example, in EP1459882 B1, EP1559542 A1, and WO 2011123790 A1 (so-called nano-molding technology or "NMT-treated").

In the past, to achieve strong adhesion between a PAEK and a nano-structured metal substrate, extremely high mold temperatures were required. For example, mold temperatures at or near 200° C. have been necessary to achieve adequate adhesion. These very high mold temperatures can be achieved in a laboratory setting or other specialized set up, but are not practical for a high volume production environment due to safety considerations and operational complexities that accompany the very high mold temperature.

Accordingly, a need exists for new PAEK polymer compositions capable of achieving good adhesion to metal substrates and that are also able to be processed using lower mold temperatures that are attainable on a routine basis and without any operational concerns.

DETAILED DESCRIPTION OF PREFERRED EMBODIMENTS

Applicants have now surprisingly discovered polymer compositions including certain PAEKs that are capable of forming strong adhesive bonds with metal surfaces and that may be processed using relatively low mold temperatures ranging from 150° C. to 180° C.

Exemplary embodiments are directed to a poly(aryl ether ketone) component including a poly(aryl ether ketone) (PAEK) having a melting temperature (Tm), a crystallization temperature (Tc), and a glass transition temperature (Tg) satisfying the relationship:

$$(Tm-Tc)/(Tm-Tg) \geq 0.31, \text{ or}$$

an amorphous poly(aryl ether ketone) (PAEK) and a semi-crystalline poly(aryl ether ketone) (PAEK); and from 0.5 wt. % to 5 wt. %, preferably from 1 wt. % to 3 wt. %, by weight of the polymer composition of at least one low molecular weight aromatic compound.

The polymer composition may optionally further comprise a reinforcing filler, preferably glass fiber.

For the sake of clarity, throughout the present application:
  "melting temperature (Tm)" or "Tm" means the melting temperature measured by differential scanning calorimetry (DSC) as described in the Examples.
  "crystallization temperature (Tc)" or "Tc" means the crystallization temperature measured by differential scanning calorimetry (DSC) as described in the Examples.
  "glass transition temperature (Tg)" or Tg means the glass transition temperature measured by differential scanning calorimetry (DSC) as described in the Examples.
  the term "halogen" includes fluorine, chlorine, bromine, and iodine, unless indicated otherwise; and
  the adjective "aromatic" denotes any mono- or polynuclear cyclic group (or moiety) having a number of $\pi$ electrons equal to $4n+2$, where n is 1 or any positive integer; an aromatic group (or moiety) can be an aryl and arylene group (or moiety).
  "structured metal surface" means a metal surface that has undergone any etching process known to those of skill in the art to roughen the metal surface by removing at least part of the metal.
  "nano-structured metal surface" means a metal surface that has been etched to have a nano-pitted surface with surface peaks and valleys having average depth, height and width dimensions in the nano-scale regime ranging from 10 to 1000 nm, preferably from 30 to 800 nm, and more preferably from 50 to 500 nm.
  "NMT-treated metal surface" means a nano-structured surface prepared by any non-comparative etching or non-comparative etching/priming process described in EP1459882 B1, EP1559542 A1, or WO 2011123790 A1, the disclosures all of which are incorporated herein by reference in their entireties.
  the term "mobile electronic device" is intended to denote any electronic device that is designed to be conveniently transported and used in various locations while exchanging/providing access to data, e.g. through wireless connections or mobile network connection. Representative examples of mobile electronic devices include mobile phones, personal digital assistants, laptop computers, tablet computers, radios, cameras and camera accessories, watches, calculators, music players, global positioning system receivers, portable games, hard drives and other electronic storage devices, and the like.
  "mold temperature" means the actual mold surface temperature as measured with a surface probe, not the mold set point temperature of the recirculating fluid of the mold heater.
  "adhesion strength" means the lap shear strength as measured according to ASTM D1002.

"heat of fusion" means the heat of fusion as measured by DSC according to ASTM D3418-03 using the second heat scan with the melting of the PAEK taken as the area over a linear baseline drawn from 50° C. above the Tg to a temperature above the last endotherm.

"amorphous poly(aryl ether ketone) (PAEK)" means a PAEK that does not exhibit a melting point (Tm).

"semi-crystalline poly(aryl ether ketone) (PAEK)" means a PAEK that exhibits a melting point (Tm).

"molecular weight" means the number average molecular weight (Mn) as measured by gel permeation chromatography (GPC) using polystyrene calibration standards.

Poly(Aryl Ether Ketone)s (PAEK)

As used herein, a "poly(aryl ether ketone) (PAEK)" denotes any polymer comprising more than 50 mol % of recurring units ($R_{PAEK}$) comprising a Ar'—C(=O)—Ar" group, where Ar' and Ar", equal to or different from each other, are aromatic groups. The recurring units ($R_{PAEK}$) are selected from the group consisting of units of formulae (J-A) to (J-Q) below:

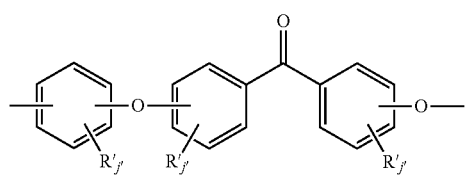
(J-A)

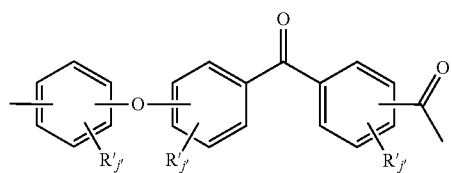
(J-B)

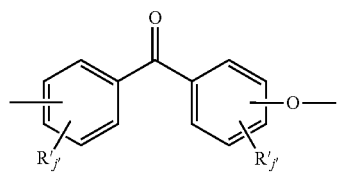
(J-C)

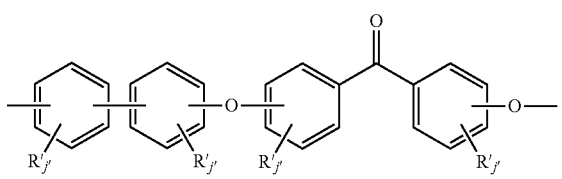
(J-D)

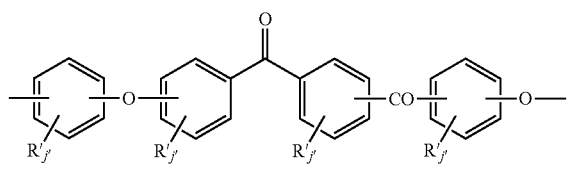
(J-M)

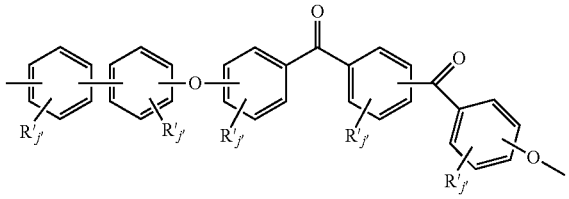
(J-Q)

where:
each R' of $R'_j$, equal to or different from each other, is selected from the group consisting of halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium; and j' is zero or an integer ranging from 1 to 4.

In recurring unit ($R_{PAEK}$), the respective phenylene moieties may independently have 1,2-, 1,4- or 1,3-linkages to the other moieties different from R' in the recurring unit ($R_{PAEK}$). Preferably, said phenylene moieties have 1,3- or 1,4-linkages, more preferably they have a 1,4-linkage.

In recurring units ($R_{PAEK}$), j' is preferably at each occurrence zero so that the phenylene moieties have no other substituents than those linking the main chain of the polymer.

In some embodiments, the PAEK is poly(ether ether ketone) (PEEK). As used herein, a "poly(ether ether ketone) (PEEK)" denotes any polymer of which more than 50 mol % of the recurring units ($R_{PAEK}$) are recurring units of formula J'-A:

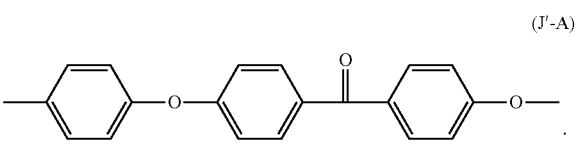
(J'-A)

Preferably at least 60 mol %, 70 mol %, 80 mol %, 90 mol %, 95 mol %, 99 mol %, and most preferably all of recurring units ($R_{PAEK}$) are recurring units (J'-A).

In another preferred embodiment, the PAEK is poly(ether ketone ketone) (PEKK). As used herein, a "poly(ether ketone ketone) (PEKK)" denotes any polymer of which more than 50 mol % of the recurring units ($R_{PAEK}$) are a combination of recurring units of formula J'-B and formula J"-B

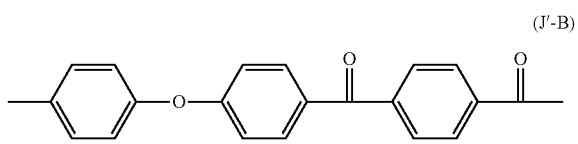
(J'-B)

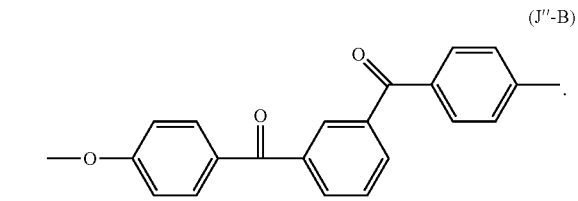
(J"-B)

Preferably at least 60 mol %, 70 mol %, 80 mol %, 90 mol %, 95 mol %, 99 mol %, and most preferably all of recurring units ($R_{PAEK}$) are a combination of recurring units (J'-B) and (J"-B).

Preferably the number of units (J'-B) is at least 58 mol %, more preferably at least 65 mol % and most preferably at least 68 mol % of the total number of units (J'-B) and (J"-B). Preferably the number of units (J'-B) is at most 85 mol %, more preferably at most 83 mol %, and most preferably at most 75 mol % of the total number of units (J'-B) and (J"-B). When the mole ratio of (J'-B)/(J"-B) is 60/40 or less, the PEKK is considered amorphous. Conversely, when the mole ratio of (J'-B)/(J"-B) is greater than 60/40, the PEKK is considered semi-crystalline.

PEKK is available under the trademark Cypek® from Solvay, SA. Cypek® FC is a semi-crystalline grade that meets the requirement, $[(Tm-Tc)/(Tm-Tg)] \geq 0.31$.

In yet another preferred embodiment, the PAEK is poly(ether ketone) (PEK). As used herein, a "poly(ether ketone) (PEK)" denotes any polymer of which more than 50 mol % of the recurring units ($R_{PAEK}$) are recurring units of formula (J'-C):

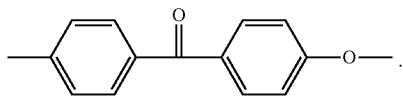

(J'-C)

Preferably at least 60 mol %, 70 mol %, 80 mol %, 90 mol %, 95 mol %, 99 mol %, and most preferably all of recurring units ($R_{PAEK}$) are recurring units (J'-C).

In yet another preferred embodiment, the PAEK is poly(ether ether ketone ketone) (PEEKK). As used herein, a "poly(ether ether ketone ketone) (PEEKK)" denotes any polymer of which more than 50 mol % of the recurring units ($R_{PAEK}$) are recurring units of formula (J'-M):

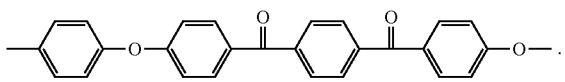

(J'-M)

Preferably at least 60 mol %, 70 mol %, 80 mol %, 90 mol %, 95 mol %, 99 mol %, and most preferably all of recurring units ($R_{PAEK}$) are recurring units (J'-M).

In some embodiments, the PAEK is a PEEK-PEDEK copolymer. As used herein, a "PEEK-PEDEK copolymer" denotes any polymer of which more than 50 mol % of the recurring units ($R_{PAEK}$) are both recurring units of formula J'-A (PEEK) and formula J'-D (poly(diphenyl ether ketone) (PEDEK)):

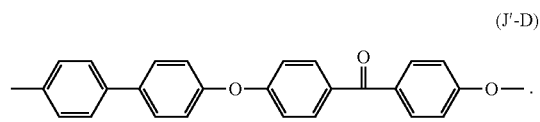

(J'-D)

The PEEK-PEDEK copolymer may include relative molar proportions of recurring units J'-A and J'-D (PEEK/PEDEK) ranging from 95/5 to 60/40, preferably from 90/10 to 70/30, more preferably from 85/15 to 75/25. Preferably the sum of recurring units J'-A and J'-D represents at least 60 mol %, 70 mol %, 80 mol %, 90 mol %, 95 mol %, 99 mol %, of recurring units in the PAEK. In some aspects, recurring units J'-A and J'-D represent all of the recurring units in the PAEK.

In some embodiments, the PAEK is a PEDEKK polymer. As used herein, a "PEDEKK" denotes any polymer of which more than 50 mol % of the recurring units ($R_{PAEK}$) are both recurring units of formula J'-Q (PEDEKK) and formula J"-Q (PEDEKmK):

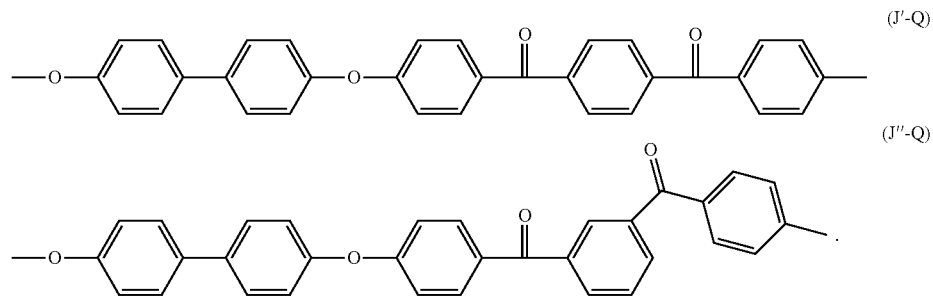

Preferably at least 60 mol %, 70 mol %, 80 mol %, 90 mol %, 95 mol %, 99 mol %, and most preferably all of recurring units ($R_{PAEK}$) are a combination of recurring units (J'-Q) and (J'-Q). Preferably the number of units (J"-Q) is at least 50 mol %, 70 mol %, 90 mol %, and most preferably all of the total number of units (J'-Q) and (J"-Q).

The polymer composition may include one or more than one PAEK.

The polymer composition includes a PAEK component including at least one PAEK each having a melting temperature (Tm), a crystallization temperature (Tc), and a glass transition temperature (Tg), respectively, satisfying the relationship:

$(Tm-Tc)/(Tm-Tg) \geq 0.31$.

PEEK-PEDEK copolymer, PEDEKK, and semi-crystalline PEKK are examples of PAEKs that satisfy this relationship. Conversely, PEEK, PEK, PEEKK, and amorphous PEKK are examples of PAEKs that do not satisfy this relationship. Thus, in some embodiments, the polymer composition includes at least one PAEK selected from a PEEK-PEDEK copolymer, a PEDEKK, and a semi-crystalline PEKK.

In exemplary embodiments, the PAEK component includes an amorphous poly(aryl ether ketone) (PAEK), preferably an amorphous PEKK. When the polymer composition includes an amorphous PAEK, it further includes at least one semi-crystalline PAEK. The semi-crystalline PAEK optionally is a PAEK having a melting temperature (Tm), a crystallization temperature (Tc), and a glass transition temperature (Tg), satisfying the relationship:

$(Tm-Tc)/(Tm-Tg) \geq 0.31$.

The polymer composition as a whole exhibits a heat of fusion of at least 8 J/g, preferably at least 16 J/g, most preferably at least 24 J/g.

In some aspects, the PAEK component includes at least one first PAEK selected from PEEK-PEDEK copolymer, PEDEKK, and semi-crystalline PEKK, and at least one second PAEK selected from PEEK, PEK, PEEKK, and amorphous PEKK. When the PAEK component includes two PAEKs, the concentration of the first PAEK in the polymer composition can range from 1 to 99 wt. %, preferably 20 to 80 wt. %, and the concentration of the second PAEK in the polymer composition can range from 1 to 99 wt. %, preferably 20 to 80 wt. %.

According to exemplary embodiments, the PAEK component may include a blend of a first PAEK and a second PAEK as shown in Table 1 below:

TABLE 1

| PAEK 1 | PAEK 2 |
|---|---|
| PEKK (semi-crystalline) | PEEK-PEDEK copolymer |
| PEKK (semi-crystalline) | PEDEKK |
| PEKK (semi-crystalline) | PEEK |
| PEKK (semi-crystalline) | PEK |
| PEKK (semi-crystalline) | PEEKK |
| PEKK (semi-crystalline) | PEKK (amorphous) |
| PEEK-PEDEK copolymer | PEDEKK |
| PEEK-PEDEK copolymer | PEEK |
| PEEK-PEDEK copolymer | PEK |
| PEEK-PEDEK copolymer | PEEKK |
| PEEK-PEDEK copolymer | PEKK (amorphous) |
| PEDEKK | PEEK |
| PEDEKK | PEK |
| PEDEKK | PEEKK |
| PEDEKK | PEKK (amorphous) |
| PAEK (amorphous) | PEEK |

The total amount of PAEKs in the polymer composition preferably ranges from 50.0 to 99.5% by total weight of the polymer composition.

When the PAEK component includes more than one PAEK, the total amount of PAEKs meeting the $(Tm-Tc)/(Tm-Tg) \geq 0.31$ relationship or total amount of amorphous PAEK preferably ranges from 30 to 90%, more preferably from 40 to 80% by total weight of the PAEKs in the polymer composition.

At least one and preferably all of the PAEK exhibit a melt viscosity of at least 0.05 kN-s/m² measured according to ASTM D3835 at 400° C. and 1000 s-using a tungsten carbide die of 0.5×3.175 mm, more preferably of at least 0.07 kN-s/m², more preferably of at least 0.08 kN-s/m².

At least one and preferably all of the PAEK exhibit a melt viscosity of at most 0.50 kN-s/m² measured according to ASTM D3835 at 400° C. and 1000 s-using a tungsten carbide die of 0.5×3.175 mm, more preferably of at most 0.40 kN-s/m², more preferably of at most 0.30 kN-s/m².

Low Molecular Weight Aromatic Compound

As used herein a "low molecular weight aromatic compound" means at least one compound selected from the group consisting of compounds of formula:

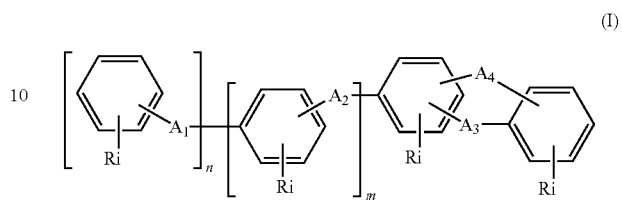

where each of $A_1$, $A_3$, and $A_4$ is independently selected from the group consisting of a bond, a sulfone group [—S(=O)$_2$—], a ketone group [—C(=O)—], an ether [—O—], and a group —C($R^5$)($R^6$)—, provided that $A_4$ is optional.

Each $A_2$ is independently selected from the group consisting of a bond, a sulfone group [—S(=O)$_2$—], a ketone group [—C(=O)—], an ether [—O—], a group —C($R^5$)($R^6$)—, and a group:

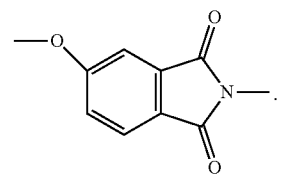

Each $R^5$ and $R^6$ is independently selected from the group consisting of a hydrogen, a halogen, an optionally-halogenated alkyl, an alkenyl, an alkynyl, a phenyl, an ether, a thioether, a carboxylic acid, an ester, an amide, an imide, an alkali or alkaline earth metal sulfonate, an alkyl sulfonate, an alkali or alkaline earth metal phosphonate, an alkyl phosphonate, a —CF$_3$ group, an amine, and a quaternary ammonium. Each $R^5$ and $R^6$ is preferably a methyl or phenyl group.

Each R is independently selected from the group consisting of a halogen, an alkyl, an alkenyl, an alkynyl, an aryl, an ether, a thioether, a carboxylic acid, an ester, an amide, an imide, an alkali or alkaline earth metal sulfonate, an alkyl sulfonate, an alkali or alkaline earth metal phosphonate, an alkyl phosphonate, an amine, and a quaternary ammonium.

Each i is independently selected from 0, 1, 2, 3, 4, and 5; provided, however, that the maximum value for i is equal to the number of positions free for substitution on the respective aromatic ring. For example, i may range from 0 to 5 for terminal phenyl groups but only range from 0 to 4 for non-terminal phenyl groups. Preferably, i is 0.

n is an integer selected from 0 and 1, and m is an integer ranging from 0 to 32.

The linkages between the phenylene units and $A_1$-$A_4$ may independently have 1,2-, 1,3- or 1,4-linkages. Preferably, the linkages are 1,3- or 1,4-.

The low molecular weight aromatic compound has a molecular weight ranging from 154 g/mol to 3000 g/mol, preferably from 154 g/mol to 2000 g/mol, more preferably from 154 g/mol to 1000 g/mol, most preferably from 154 g/mol to 500 g/mol.

In some aspects, the low molecular weight aromatic compound is selected from compounds of formula (II)

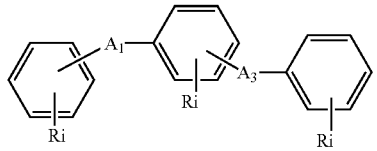
(II)

where $A_1$, $A_3$, R, and i are as described above.

Suitable examples of low molecular weight aromatic compounds of formula (II) are 1,3-diphenoxybenzene, 1,4-diphenoxybenzene, m-terphenyl, and p-terphenyl.

In some aspects, the low molecular weight aromatic compound is selected from compounds of formula (III):

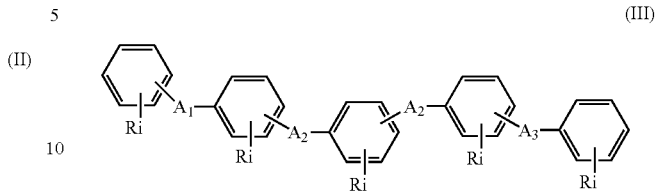
(III)

where $A_1$, $A_2$, $A_3$, R and i are as described above.

Suitable examples of low molecular weight aromatic compounds of formula (III) are polyphenylether compounds sold under the trade name Santovac® from SantoLubes LLC, South Carolina, USA.

In some embodiments, the low molecular weight aromatic compound of formula (III) is 1,4-Bis(4-phenoxybenzoyl)benzene of formula (IIIA) below:

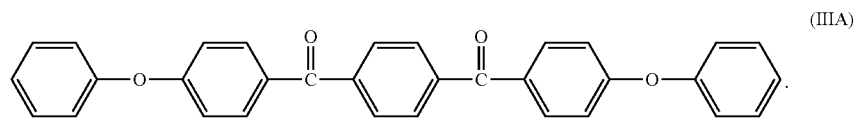 [SMILES: O=C(c1ccc(Oc2ccccc2)cc1)c1ccc(C(=O)c2ccc(Oc3ccccc3)cc2)cc1]
(IIIA)

In some aspects the low molecular weight aromatic compound is selected from compounds of formula (IV):

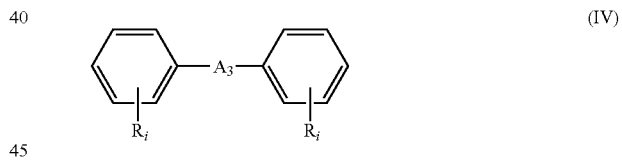
(IV)

where $A_3$, R, and i are as described above.

The low molecular weight aromatic compound is preferably diphenyl sulfone, 1,4-Bis(4-phenoxybenzoyl)benzene, alkali metal diphenyl sulfone sulfonate, benzophenone, or a combination thereof. Most preferably, the low molecular weight aromatic compound is diphenyl sulfone or 1,4-Bis(4-phenoxybenzoyl)benzene.

According to alternative embodiments the low molecular weight aromatic compound is an imide preferably selected from compounds of formulae (V) and (VI):

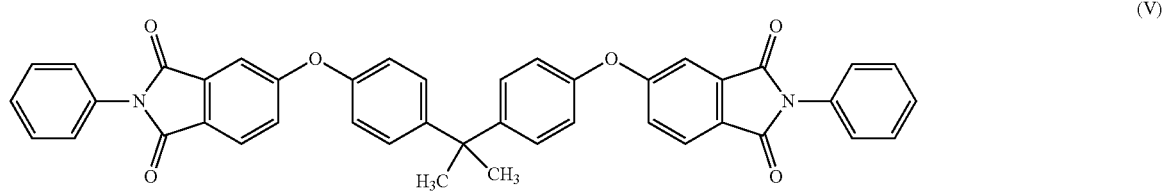
(V)

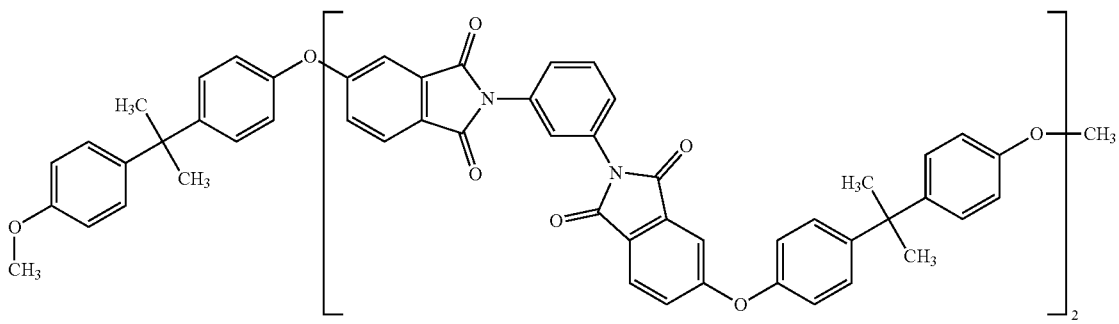

(VI)

The low molecular weight aromatic compound preferably ranges from 0.5 wt. % to 5 wt. %, preferably from 1 wt. % to 3 wt. %, by weight of the polymer composition. Most preferably, the low molecular weight aromatic compound ranges from 1.5 wt. % to 2.5 wt. % by weight of the polymer composition.

Optional Reinforcing Fillers

A large selection of reinforcing fillers may be added to the polymer composition. They are preferably selected from fibrous and particulate fillers. A fibrous reinforcing filler is considered herein to be a material having length, width and thickness, wherein the average length is substantially larger than both the width and thickness. Preferably, such a material has an aspect ratio, defined as the average ratio between the length and the smallest of the width and thickness of at least 5. Preferably, the aspect ratio of the reinforcing fibers is at least 10, still more preferably at least 20. The particulate fillers have an aspect ratio of at most 5, preferably at most 2.

Preferably, the reinforcing filler is selected from glass fibers, carbon fibers, carbon nano-tubes, boron nitride fibers, silicon carbide whiskers and boron fibers. Other high aspect ratio reinforcing fillers will be obvious to those skilled in the art. It can also be selected from mineral fillers, such as talc, mica, titanium dioxide, kaolin, calcium carbonate, calcium silicate, magnesium carbonate; boron nitride, wollastonite; and the like, and can include carbon based fillers like graphene, graphite, carbon black and other carbon based particulate fillers.

The reinforcing filler may be present in the polymer composition in an amount of at least 5 wt. %, preferably at least 10 wt. %, more preferably at least 15 wt. %, based on the total weight of the polymer composition.

The reinforcing filler is also preferably present in an amount of at most 50 wt. %, still more preferably at most 40 wt. %, based on the total weight of the polymer composition.

Preferably, the amount of the reinforcing filler ranges from 10 wt. % to 50 wt. %, more preferably from 20 wt. % to 40 wt. % of the polymer composition. Most preferably, the amount of the reinforcing filler is about 30 wt. % of the polymer composition.

Additional Ingredients

In some aspects, the polymer composition may include one or more optional additives such as a colorant such as a dye and/or a pigment, for example, titanium dioxide, zinc sulfide, zinc oxide, ultraviolet light stabilizers, heat stabilizers, antioxidants such as organic phosphites and phosphonites, acid scavengers, processing aids, nucleating agents, lubricants, flame retardants, a smoke-suppressing agents, an anti-static agents, anti-blocking agents, and/or conductivity additives such as carbon black.

When one or more additional ingredients are present, their total weight is preferably less than 20 wt. %, less than 10 wt. %, less than 5 wt. % and most preferably less than 2 wt. %, based on the total weight of polymer composition.

Exemplary Polymer Compositions

In some embodiments, the polymer composition includes a low molecular weight aromatic compound and a blend of a first PAEK and a second PAEK (if applicable) as shown in Table 1A below:

TABLE 1A

| PAEK 1 | PAEK 2 | Low Molecular Weight Aromatic Compound |
|---|---|---|
| PEKK (semi-crystalline) | PEEK-PEDEK copolymer | diphenyl sulfone |
| PEKK (semi-crystalline) | PEDEKK | diphenyl sulfone |
| PEKK (semi-crystalline) | PEEK | diphenyl sulfone |
| PEKK (semi-crystalline) | PEK | diphenyl sulfone |
| PEKK (semi-crystalline) | PEEKK | diphenyl sulfone |
| PEKK (semi-crystalline) | PEKK (amorphous) | diphenyl sulfone |
| PEEK-PEDEK copolymer | PEDEKK | diphenyl sulfone |
| PEEK-PEDEK copolymer | PEEK | diphenyl sulfone |
| PEEK-PEDEK copolymer | PEK | diphenyl sulfone |
| PEEK-PEDEK copolymer | PEEKK | diphenyl sulfone |
| PEEK-PEDEK copolymer | PEKK (amorphous) | diphenyl sulfone |
| PEDEKK | PEEK | diphenyl sulfone |
| PEDEKK | PEK | diphenyl sulfone |
| PEDEKK | PEEKK | diphenyl sulfone |
| PEDEKK | PEKK (amorphous) | diphenyl sulfone |
| PAEK (amorphous) | PEEK | diphenyl sulfone |
| PEKK (semi-crystalline) | — | diphenyl sulfone |
| PEEK-PEDEK copolymer | — | diphenyl sulfone |
| PEKK (semi-crystalline) | PEEK-PEDEK copolymer | 1,4-Bis(4-phenoxybenzoyl)benzene |
| PEKK (semi-crystalline) | PEDEKK | 1,4-Bis(4-phenoxybenzoyl)benzene |
| PEKK (semi-crystalline) | PEEK | 1,4-Bis(4-phenoxybenzoyl)benzene |
| PEKK (semi-crystalline) | PEK | 1,4-Bis(4-phenoxybenzoyl)benzene |
| PEKK (semi-crystalline) | PEEKK | 1,4-Bis(4-phenoxybenzoyl)benzene |
| PEKK (semi-crystalline) | PEKK (amorphous) | 1,4-Bis(4-phenoxybenzoyl)benzene |

TABLE 1A-continued

| PAEK 1 | PAEK 2 | Low Molecular Weight Aromatic Compound |
|---|---|---|
| PEEK-PEDEK copolymer | PEDEKK | 1,4-Bis(4-phenoxybenzoyl)benzene |
| PEEK-PEDEK copolymer | PEEK | 1,4-Bis(4-phenoxybenzoyl)benzene |
| PEEK-PEDEK copolymer | PEK | 1,4-Bis(4-phenoxybenzoyl)benzene |
| PEEK-PEDEK copolymer | PEEKK | 1,4-Bis(4-phenoxybenzoyl)benzene |
| PEEK-PEDEK copolymer | PEKK (amorphous) | 1,4-Bis(4-phenoxybenzoyl)benzene |
| PEDEKK | PEEK | 1,4-Bis(4-phenoxybenzoyl)benzene |
| PEDEKK | PEK | 1,4-Bis(4-phenoxybenzoyl)benzene |
| PEDEKK | PEEKK | 1,4-Bis(4-phenoxybenzoyl)benzene |
| PEDEKK | PEKK (amorphous) | 1,4-Bis(4-phenoxybenzoyl)benzene |
| PAEK (amorphous) | PEEK | 1,4-Bis(4-phenoxybenzoyl)benzene |
| PEKK (semi-crystalline) | — | 1,4-Bis(4-phenoxybenzoyl)benzene |
| PEEK-PEDEK copolymer | — | 1,4-Bis(4-phenoxybenzoyl)benzene |

Method of Making the Polymer Composition

The polymer composition can be made by melt mixing or powder blending the at least one PAEK, the low molecular weight aromatic compound, and any optional ingredients.

The components of the mixture may be added or mixed in any order, in any amount or fraction of their total amount, and may be mixed separately or simultaneously.

The preparation of the polymer composition can be carried out by any known melt-mixing process that is suitable for preparing thermoplastic molding compositions. Such a process may be carried out by heating the PAEK above its melting temperature to form a melt.

In the some aspects of the process for the preparation of the polymer composition, the components for forming the polymer composition are fed to the melt-mixing apparatus and melt-mixed in that apparatus. Suitable melt-mixing apparatuses are, for example, kneaders, Banbury mixers, single-screw extruders, and twin-screw extruders. Preferably, use is made of an extruder fitted with means for dosing the desired components to the extruder, either to the extruder's throat or to the melt.

The polymer compositions described herein are advantageously provided in the form of pellets, which may be used in injection molding or extrusion processes known in the art.

Exemplary embodiments are also directed to a method of increasing the adhesion strength of a polymer composition including a PAEK as described herein to a metal surface, preferably a structured metal surface, more preferably a nano-structured metal surface, and most preferably an NMT-treated metal surface by adding to the polymer composition a low molecular weight aromatic compound as described herein.

In particular, exemplary embodiments include a method of increasing the adhesion strength of a polymer composition to a metal surface, preferably a nano-structured metal surface, including adding to the polymer composition from 0.5 wt. % to 5 wt. %, preferably from 1 wt. % to 3 wt. %, by weight of the polymer composition of at least one low molecular weight aromatic compound of formula (I) as described above wherein the polymer composition includes a poly(aryl ether ketone) (PAEK) component including a poly(aryl ether ketone) (PAEK) having a melting temperature (Tm), a crystallization temperature (Tc), and a glass transition temperature (Tg) satisfying the relationship:

$$(Tm-Tc)/(Tm-Tg) \geq 0.31, \text{ or}$$

an amorphous poly(aryl ether ketone) (PAEK) and a semi-crystalline poly(aryl ether ketone) (PAEK), and; optionally a reinforcing filler, preferably a glass fiber, where the polymer composition exhibits a heat of fusion of at least 8 J/g, preferably at least 16 J/g, most preferably at least 24 J/g.

The polymer compositions described herein preferably exhibit a Tg of at least 5° C. lower than the lowest Tg of PAEKs in the composition, more preferably at least 7° C. lower than the lowest Tg of PAEKs in the composition (as measured in the Examples at half-height on $2^{nd}$ heat cycle at 20° C./minute), where the Tg of the polymer composition is the lowest Tg in the case where the polymer composition exhibits more than one Tg.

Polymer-Metal Junction and Method of Making

Exemplary embodiments are also directed to a polymer-metal junction including the polymer composition as described herein in contact with, preferably adhered to, a metal surface and a method of making the polymer-metal junction.

The metal surface as described herein does not include a metal surface of a mold.

The metal can include any metallic composition including, but not limited to, aluminum, copper, gold, iron, nickel, platinum, silver, steel, and blends or alloys thereof (e.g., brass and bronze).

The polymer-metal junction can be made by contacting the polymer composition as described herein with a metal surface, preferably a structured metal surface, more preferably a nano-structured metal surface, most preferably an NMT-treated metal surface. For example, the polymer composition may be deposited on or over-molded onto the metal surface using any suitable melt-processing and deposition method. In particular, the polymer-metal junction may be made by injection or compression molding the polymer composition onto the metal surface.

In some embodiments, the polymer-metal junction is formed by injection molding the polymer composition onto a metal surface, preferably a structured metal surface, more preferably a nano-structured metal surface, most preferably an NMT-treated metal surface, using a mold temperature ranging from 150 to 190° C., preferably 160 to 180° C.

In some aspects, the polymer-metal junction exhibits a lap shear strength as measured according to ASTM D1002 greater than or equal to 10 MPa, 12 MPa, 15 MPa, 20 MPa, and most preferably greater than or equal to 25 MPa. The polymer-metal junction may exhibit a lap shear strength as measured according to ASTM D1002 that is preferably at least 150%, 200%, 300%, and most preferably at least 400% greater than the lap shear strength of a polymer-metal junction including an otherwise identical polymer composition without the low molecular weight compound.

In some embodiments, the nano-structured metal surface includes a layer of a trivalent aluminum compound, preferably having a thickness of about 1 nm. In some aspects, the nano-structured metal surface includes nitrogen detectable by X-ray photoelectron spectroscopy. In some embodiments, the nano-structured metal surface is anodized. In some embodiments, the nano-structured surface includes a primer material, preferably an organosilane, a titanate, an aluminate, a phosphate, or a zirconate.

The polymer composition may be well suited for the manufacture polymer-metal junctions in a wide variety of applications including automotive, electrical, and mobile electronic devices.

According to exemplary embodiments, the polymer-metal junction may be formed by an extrusion process for coating a wire or cable. For example, a wire or cable may be optionally etched, nano-etched, or NMT-treated and then pre-heated to a temperature ranging from 150° C. to 180° C. prior to deposition of the polymer composition in a continuous melt extrusion wire coating process.

The invention will be herein after illustrated in greater detail in the following section by means of non-limiting examples.

EXAMPLES

Seven working examples and seven corresponding comparative examples are provided. All the compositions prepared and evaluated are shown below in Tables 3 and 4.
Materials
Four different PAEK polymers were used:
1) PEEK homopolymer: KetaSpire® KT-880P from Solvay Specialty Polymers USA, LLC. This grade has a melt viscosity in the range 120-180 Pa-s as measured at 400° C. and 1000 l/s according to ASTM D-3835;
2) PEKK polymer: Cypek® FC obtained from Solvay SA; This grade has a melt viscosity in the range 100-300 Pa-s as measured at 400° C. and 1000 l/s according to ASTM D-3835;
3) 80-20 PEEK-PEDEK copolymer produced according to Preparative Example A.
4) 85-15 PEEK-PEDEK copolymer produced according to Preparative Example B.

The PEEK-PEDEK copolymers had a melt viscosity in the range 120-200 Pa-s as measured at 400° C. and 1000 l/s shear rate according to ASTM D-3835.

Glass Fiber: Chopped S-glass fiber having a nominal filament diameter of 9 micrometers and a high temperature sizing designated 553 and designed for reinforcement of high temperature polymers such as polyphenylene sulfide and PEEK. This glass fiber was procured from AGY Corporation.

Low MW Aromatic Compounds: Diphenylsulfone obtained from Proviron America, Inc. having a purity of 99.9%, and commercially available 1,4-Bis(4-phenoxybenzoyl)benzene.
Thermal Properties of the PAEKs Thermal properties of melting point (Tm), glass transition temperature (Tg), and crystallization temperature upon cooling from the melt (Tc) were measured for the PAEK polymers used in this study using differential scanning calorimetry according to ASTM D3418 employing a heating and cooling rate of 20° C./min. Three scans were used for each DSC test: a first heat up to 400° C., followed by a first cool down to 50° C., followed by a second heat up to 400° C. The Tc was recorded as the peak crystallization temperature during the first cool down. The Tg was recorded from the second heat up using the half height method, and the Tm was also determined from the second heat up as the peak temperature on the melting endotherm. The parameter [(Tm−Tc)/(Tm−Tg)] was then computed from the three parameters measured according to the above methodology. The four described thermal parameters for the PAEK polymers used in the examples and comparative examples are tabulated in Table 2.

TABLE 2

| Components | Tg (° C.) | Tm (° C.) | Tc (° C.) | (Tm − Tc)/(Tm − Tg) |
|---|---|---|---|---|
| KetaSpire ® KT-880P PEEK | 149 | 340 | 288 | 0.27 |
| Cypek ® FC PEKK | 150 | 339 | 272 | 0.35 |
| 80-20 PEEK-PEDEK | 154 | 312 | 250 | 0.39 |
| 85-15 PEEK-PEDEK | 151 | 320 | 261 | 0.35 |

The heat of fusion was measured by DSC according to ASTM D3418-03 using the second heat scan with the melting of the PAEK taken as the area over a linear baseline drawn from 50° C. above the Tg to a temperature above the last endotherm.

Preparative Example A

Preparation of PEEK-PEDEK Copolymer 80/20 [Repeat Units (J'A) and (J'D)]

In a 500 mL 4-neck reaction flask fitted with a stirrer, a $N_2$ inlet tube, a Claisen adapter with a thermocouple plunging in the reaction medium, and a Dean-Stark trap with a condenser and a dry ice trap were introduced 127.7 g of diphenyl sulfone, 21.861 g of hydroquinone, 9.207 g of 4,4'-biphenol and 54.835 g of 4,4'-difluorobenzophenone. The flask content was evacuated under vacuum and then filled with high purity nitrogen (containing less than 10 ppm $O_2$). The reaction mixture was then placed under a constant nitrogen purge (60 mL/min).

The reaction mixture was heated slowly to 150° C. At 150° C., a mixture of 27.339 g of $Na_2CO_3$ and 0.171 g of $K_2CO_3$ was added via a powder dispenser to the reaction mixture over 30 minutes. At the end of the addition, the reaction mixture was heated to 320° C. at 1° C./minute. After 4 minutes at 320° C., 6.577 g of 4,4'-difluorobenzophenone were added to the reaction mixture while keeping a nitrogen purge on the reactor. After 5 minutes, 1.285 g of lithium chloride were added to the reaction mixture. 10 minutes later, another 2.192 g of 4,4'-difluorobenzophenone were added to the reactor and the reaction mixture was kept at temperature for 15 minutes.

The reactor content was then poured from the reactor into a SS pan and cooled. The solid was broken up and ground in an attrition mill through a 2 mm screen. Diphenyl sulfone and salts were extracted from the mixture with acetone and water at pH between 1 and 12. The powder was then removed from the reactor and dried at 120° C. under vacuum for 12 hours yielding 72 g of a white powder.

The melt viscosity measured by capillary rheology at 400° C., 1000 s−1 using a tungsten carbide die of 0.5×3.175 mm was 0.20 kN-s/m².

Preparative Example B

Preparation of PEEK-PEDEK Copolymer 85/15 [Repeat Units (J'A) and (J'D)]

In a 500 mL 4-neck reaction flask fitted with a stirrer, a $N_2$ inlet tube, a Claisen adapter with a thermocouple plunging in the reaction medium, and a Dean-Stark trap with a condenser and a dry ice trap were introduced 127.6 g of diphenyl sulfone, 23.471 g of hydroquinone, 6.983 g of 4,4'-biphenol and 55.477 g of 4,4'-difluorobenzophenone. The flask content was evacuated under vacuum and then filled with high purity nitrogen (containing less than 10 ppm $O_2$). The reaction mixture was then placed under a constant nitrogen purge (60 mL/min).

The reaction mixture was heated slowly to 150° C. At 150° C., a mixture of 27.504 g of $Na_2CO_3$ and 0.173 g of $K_2CO_3$ was added via a powder dispenser to the reaction mixture over 30 minutes. At the end of the addition, the reaction mixture was heated to 320° C. at 1° C./minute. After 10 minutes at 320° C., 6.546 g of 4,4'-difluorobenzophenone were added to the reaction mixture while keeping a nitrogen purge on the reactor. After 5 minutes, 1.065 g of lithium chloride were added to the reaction mixture. 10 minutes later, another 2.182 g of 4,4'-difluorobenzophenone were added to the reactor and the reaction mixture was kept at temperature for 15 minutes.

The reactor content was then poured from the reactor into a SS pan and cooled. The solid was broken up and ground in an attrition mill through a 2 mm screen. Diphenyl sulfone and salts were extracted from the mixture with acetone and water at pH between 1 and 12. The powder was then removed from the reactor and dried at 120° C. under vacuum for 12 hours yielding 70 g of a white powder.

The melt viscosity measured by capillary rheology at 400° C., 1000 s−1 using a tungsten carbide die of 0.5×3.175 mm was 0.12 kN-s/m².

Preparation of Polymer Compositions

All polymer compositions were prepared by first tumble blending pellets of the resins to be blended at the desired compositional ratios for about 20 minutes, followed by melt compounding using a 26 mm Coperion® co-rotating partially intermeshing twin screw extruder having an L/D ratio of 48:1. The extruder had 12 barrel sections with barrel sections 2 through 12 being heated with a temperature profile setting of 330° C. for barrel sections 2-4, 340° C. for barrel sections 5-10 and 350° C. for sections 11-12 and the die. The melt temperature recorded for the extrudate as it exited the die ranged from 380 to 395° C. for all the compositions. The feeding of the extruder was such that the resin component(s) and the low molecular weight aromatic additive (diphenylsulfone) were metered gravimetrically at the extruder feed hopper, while the glass fiber was metered also using a gravimetric feeder at the proportion corresponding to the 30 wt. % level in each composition at barrel section 7. The extruder was operated at a total throughput rate of 35 lb/hr (15.9 kg/hr) and 200 rpm screw speed, and the extruder torque reading was maintained in the 45-55% range during compounding of all the compositions. Vacuum venting with a vacuum level >25 in Hg was applied at barrel section 10 during compounding to strip off moisture and any possible residual volatiles from the compound. The extrudate from each of the runs was stranded and cooled in a water trough and then pelletized into pellets approximately 2.7 mm in diameter and 3.0 mm in length.

Testing of Polymer Compositions

Injection molding was performed on the example formulations for two purposes: 1) Injection molding was used to produce 3.2 mm (0.125 in) thick ASTM tensile and flexural specimens for mechanical property testing. Type I tensile ASTM specimens and 5 in×0.5 in×0.125 in flexural specimens were injection molded using PEEK injection molding guidelines provided by the supplier. 2) Injection molding of lap shear over-molded specimens was also carried out on NMT-treated aluminum (grade A-6061) coupons that were 4.5 mm long×1.75 mm wide×2 mm thick. These coupons were prepared and supplied by Taiseiplas Corp. A small rectangular specimen of polymer was over-molded onto the aluminum coupons using a three-plate mold manufactured and supplied by Taiseiplas Corp. The rectangular strip of plastic over-molded onto the aluminum coupons was 4.5 cm in length, 1 cm in width and 3 mm in thickness as nominal dimensions. The plastic piece was over-molded onto the aluminum coupons such that there was an overlap area between the two pieces defined by nominal dimensions of 10 mm×5 mm to provide a nominal overlap area of 50 mm².

The following ASTM test methods were employed in evaluating all compositions:

D638: Tensile properties—strength, modulus and elongation at break
D256: Notched Izod impact resistance
D4810: Unnotched Izod impact resistance The over-molded aluminum/plastic assembly that was obtained from the molding as described above was tested for lap shear strength in an Instron tensile test apparatus following the guidelines of ASTM D1002. A positioning fixture supplied by Taiseiplas was also used to hold the assembly in place in the Instron grips and to maintain the alignment of the metal and plastic pieces during the tensile pull on the two materials to assure that the force applied on the lap interface was a purely shear force. A pull rate of 0.05 in/min was used for the this testing and the lap shear strength of each specimen was calculated by dividing the load needed to break apart each assembly divided by the nominal overlap area of the joint.

TABLE 3

| Example | CE1 | E1 | CE2 | E2 | CE3 | E3 | CE4 | E4 |
| --- | --- | --- | --- | --- | --- | --- | --- | --- |
| KetaSpire ® KT-880P PEEK (wt. %) | — | — | — | — | 35.0 | 34.25 | 35.0 | 34.25 |
| Cypek ® FC PEKK (wt. %) | 35.0 | 34.25 | 35.0 | 34.25 | — | — | — | — |
| 80-20 PEEK-PEDEK (wt. %) | 35.0 | 34.25 | — | — | 35.0 | 34.25 | — | — |
| 85-15 PEEK-PEDEK (wt. %) | — | — | 35.0 | 34.25 | — | — | 35.0 | 34.25 |
| Fiberglass, AGY S2 553 9 µm (wt. %) | 30.0 | 30.0 | 30.0 | 30.0 | 30.0 | 30.0 | 30.0 | 30.0 |
| Diphenylsulfone (wt. %) | — | 1.5 | — | 1.5 | — | 1.5 | — | 1.5 |
| Properties | | | | | | | | |
| Tensile Strength (MPa) | 179 | 183 | 177 | 184 | 172 | 190 | 177 | 192 |
| Tensile Modulus (GPa) | 12.1 | 11.8 | 11.5 | 11.9 | 11.2 | 12.0 | 11.4 | 12.3 |
| Tensile Elongation at Break (%) | 2.7 | 2.8 | 2.8 | 2.7 | 2.6 | 2.5 | 2.6 | 2.4 |

TABLE 3-continued

| Example | CE1 | E1 | CE2 | E2 | CE3 | E3 | CE4 | E4 |
|---|---|---|---|---|---|---|---|---|
| Notched Izod (J/m) | 135 | 133 | 138 | 131 | 143 | 130 | 136 | 119 |
| Unnotched Izod (J/m) | 988 | 1025 | 1030 | 1036 | 1004 | 961 | 982 | 961 |
| Lap Shear Strength (MPa) | 5.7 | 26.9 | 5.1 | 25.8 | 13.3 | 22.1 | 8.4 | 16.0 |
| Lap Shear Strength Standard Deviation (MPa) | 3.1 | 3.8 | 3.2 | 8.9 | 1 | 4 | 4.5 | 2.9 |
| Tg of composition (° C.) | 151 | 141 | 150 | 142 | 151 | 143 | 150 | 135 |
| Heat of Fusion (J/g) | 34.0 | 32.4 | 32.3 | 32.4 | 38.0 | 35.5 | 36.3 | 36.9 |

TABLE 4

| Example | CE5 | E5 | CE6 | E6 | CE7 | E7 |
|---|---|---|---|---|---|---|
| KetaSpire ® KT-880P PEEK (wt. %) | — | — | — | — | — | — |
| Cypek ® FC PEKK (wt. %) | — | — | — | — | 70.0 | 68.5 |
| 80-20 PEEK-PEDEK (wt. %) | 70.0 | 68.5 | — | — | — | — |
| 85-15 PEEK-PEDEK (wt. %) | — | — | 70.0 | 68.5 | — | — |
| Fiberglass, AGY S2 553 9 μm (wt. %) | 30.0 | 30.0 | 30.0 | 30.0 | 30.0 | 30.0 |
| Diphenylsulfone (wt. %) | — | 1.5 | — | 1.5 | — | 1.5 |
| Properties | | | | | | |
| Tensile Strength (MPa) | 166 | 177 | 169 | 182 | 188 | 197 |
| Tensile Modulus (GPa) | 11.1 | 11.6 | 11.2 | 11.8 | 12.0 | 12.4 |
| Tensile Elongation at Break (%) | 2.9 | 2.7 | 2.8 | 2.6 | 2.7 | 2.6 |
| Notched Izod (J/m) | 163 | 152 | 153 | 139 | 126 | 122 |
| Unnotched Izod (J/m) | 1094 | 1041 | 1036 | 1004 | 1009 | 961 |
| Lap Shear Strength (MPa) | 2.4 | 21.6 | 10.0 | 16.4 | 7.7 | 15.7 |
| Lap Shear Strength Standard Deviation (MPa) | 3.8 | 6.3 | 4.5 | 9.4 | 2.3 | 3.3 |
| Tg of composition (° C.) | 153 | 135 | 148 | 142 | 150 | 137 |
| Heat of Fusion (J/g) | 30.8 | 31.8 | 32.8 | 36.2 | 30.7 | 30.3 |

TABLE 5

| Example | CE3 Bis* | E8 | E9 | E10 | E11 |
|---|---|---|---|---|---|
| KetaSpire ® KT-880P PEEK (wt. %) | 35.0 | 34.25 | 33.9 | — | 17.1 |
| 80-20 PEEK-PEDEK (wt. %) | 35.0 | 34.25 | 33.9 | 68.5 | 51.4 |
| Fiberglass, AGY S2 553 9 μm (wt. %) | 30.0 | 30.0 | 30.0 | 30.0 | 30.0 |
| 1,4-Bis(4-phenoxybenzoyl)benzene (wt. %) | — | 1.5 | 2.2 | 1.5 | 1.5 |
| Properties | | | | | |
| Tensile Strength (MPa) | 201.4 | 211.0 | 212.4 | 213 | — |
| Tensile Modulus (GPa) | 12.1 | 12.4 | 12.7 | 13.3 | — |
| Tensile Elongation at Break (%) | 2.7 | 2.6 | 2.6 | 2.5 | — |
| Flexural Strength (MPa) | 284.8 | 291.0 | 293.1 | — | — |
| Flexural Modulus (GPa) | 1690 | 1750 | 1780 | — | — |
| Flexural Strain at Break (%) | 2.8 | 2.7 | 2.7 | — | — |
| Notched Izod (J/m) | 121 | 116 | 112 | 121 | — |
| Unnotched Izod (J/m) | 1014 | 1004 | 977 | 1080 | — |
| Lap Shear Strength (MPa) | 9.2 | 15.0 | 15.3 | 27.3 | 22.8 |
| Lap Shear Strength Standard Deviation (MPa) | 2.5 | 1.5 | 1.8 | 3.2 | 2.9 |
| Tg of composition (° C.) | 150.7 | 139.1 | 138.4 | 141.3 | 140.3 |
| Heat of Fusion (J/g) | 31.7 | 32.9 | 32.5 | 31.0 | 37.1 |

*Examples 8 to 11 were performed using a different batch of NMT-treated coupons than were used in Examples 1-7 and Comparative Examples 1-7. To account for possible variations in etching between coupon batches, Comparative Example 3 was repeated as Comparative Example 3 "Bis" with coupons from the same batch as used for Examples 8 to 11.

As shown in Tables 3, 4, and 5, the polymer adhesion to the NMT-treated metal substrate (as indicated by the lap shear strength) was unexpectedly improved in all the examples in which a low molecular weight aromatic compound was included. In addition, as shown in the embodiments of Examples 1 and 2, higher polymer adhesion was unexpectedly achieved with a combination of two PAEK polymers meeting the requirement [(Tm−Tc)/(Tm−Tg)] ≥0.31 than when one such PAEK was used (Examples 3-7). Furthermore, the compositions including the low molecular weight aromatic compounds unexpectedly retained very good mechanical properties essentially on par or within a 10% deviation from the properties of the analog composition not including the low molecular weight compounds.

Examples 8-11 show that use of 1,4-bis(4-diphenoxybenzoyl)benzene) as the low molecular weight aromatic compound also unexpectedly resulted in polymer compositions exhibiting markedly improved lap shear strength.

Should the disclosure of any patents, patent applications, and publications which are incorporated herein by reference conflict with the description of the present application to the extent that it may render a term unclear, the present description shall take precedence.

The invention claimed is:

1. A polymer composition comprising:
(a) a poly(aryl ether ketone) (PAEK) component including:
(a1) a poly(aryl ether ketone) (PAEK) having a melting temperature (Tm), a crystallization temperature (Tc), and a glass transition temperature (Tg) satisfying the relationship:

$(Tm-Tc)/(Tm-Tg) \geq 0.31$, wherein the melting temperature (Tm), crystallization temperature (Tc), and glass transition temperature (Tg) are determined by differential scanning calorimetry according to ASTM D3418 employing a heating and cooling rate of 20° C./min; or
(a2) an amorphous poly(aryl ether ketone) (PAEK) and a semi-crystalline poly(aryl ether ketone) (PAEK),
(b) from 0.5 wt. % to 5 wt. %, relative to the weight of the polymer composition, of at least one low molecular weight aromatic compound of formula (I):

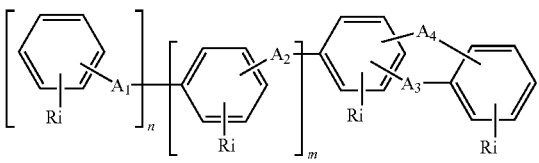

(I)

wherein:
each of $A_1$, $A_3$ and $A_4$ is independently selected from the group consisting of a bond, a sulfone group [—S(=O)$_2$—], a ketone group [—C(=O)—], an ether [—O—], and a group —C($R^5$)($R^6$)—, provided that $A_4$ is optional,
each $A_2$ is independently selected from the group consisting of a bond, a sulfone group [—S(=O)$_2$—], a ketone group [—C(=O)—], an ether [—O—], a group —C($R^5$)($R^6$)—, and a group:

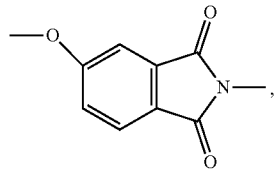

each $R^5$ and $R^6$ is independently selected from the group consisting of a hydrogen, a halogen, an optionally-halogenated alkyl, an alkenyl, an alkynyl, a phenyl, an ether, a thioether, a carboxylic acid, an ester, an amide, an imide, an alkali or alkaline earth metal sulfonate, an alkyl sulfonate, an alkali or alkaline earth metal phosphonate, an alkyl phosphonate, a —CF$_3$ group, an amine, and a quaternary ammonium;

n is an integer selected from 0 and 1;
m is an integer ranging from 0 to 32;
each R is independently selected from the group consisting of a halogen, an alkyl, an alkenyl, an alkynyl, an aryl, an ether, a thioether, a carboxylic acid, an ester, an amide, an imide, an alkali or alkaline earth metal sulfonate, an alkyl sulfonate, an alkali or alkaline earth metal phosphonate, an alkyl phosphonate, an amine, and a quaternary ammonium; and
each i is an independently selected integer ranging from 0 to 5; and
(c) optionally a reinforcing filler;
further wherein the polymer composition exhibits a heat of fusion of at least 8 J/g.

2. The polymer composition of claim 1, wherein:
the poly(aryl ether ketone) (PAEK) component (a) is the poly(aryl ether ketone) (PAEK) (a1), and
the polymer composition further includes a poly(aryl ether ketone) (PAEK) (a3) having a melting temperature (T'm), a crystallization temperature (T'c), and a glass transition temperature (T'g) satisfying the relationship: $(T'm-T'c)/(T'm-T'g) \geq 0.31$,
wherein the melting temperature (T'm), the crystallization temperature (T'c), and the glass transition temperature (T'g) are determined by differential scanning calorimetry according to ASTM D3418 employing a heating and cooling rate of 20° C./min.

3. The polymer composition of claim 1, wherein the poly(aryl ether ketone) (PAEK) component (a) is selected from the group consisting of PEEK-PEDEK copolymer, PEDEKK, and semi-crystalline PEKK.

4. The polymer composition of claim 1, wherein the low molecular weight aromatic compound (b) has a number average molecular weight (Mn) as measured by gel permeation chromatography (GPC) using polystyrene calibration standards ranging from 154 g/mol to 3000 g/mol.

5. The polymer composition of claim 1, wherein the low molecular weight aromatic compound (b) is selected from at least one compound of formulae:

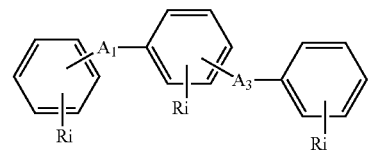

(II)

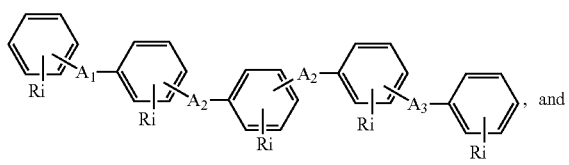

, and (III)

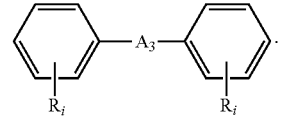

(IV)

6. The polymer composition of claim 1, wherein the low molecular weight aromatic compound (b) is diphenyl sulfone or 1,4-Bis(4-phenoxybenzoyl)benzene.

7. The polymer composition of claim 1, wherein the polymer composition comprises 10-50 wt. %, relative to the total weight of the polymer composition, of glass fiber.

8. A polymer-metal junction comprising the polymer composition of claim 1 in contact with a metal surface.

9. The polymer-metal junction of claim 8, wherein the metal surface comprises aluminum.

10. The polymer-metal junction of claim 8, wherein the polymer-metal junction exhibits a lap shear strength ≥15 MPa, when measured according to ASTM D1002.

11. A mobile electronic device comprising the polymer metal junction of claim 8.

12. A method of making a polymer-metal junction comprising contacting a metal surface with the polymer composition of claim 1.

13. The method of claim 12, wherein contacting the metal surface with the polymer composition comprises injection molding the polymer composition in a mold having a temperature ranging from 150 to 185° C.

14. The method of claim 12, wherein the polymer-metal junction exhibits a lap shear strength ≥15 MPa, when measured according to ASTM D1002.

15. A method of increasing the adhesion strength of a polymer composition to a metal surface, the method comprising:

adding to the polymer composition from 0.5 wt. % to 5 wt. %, by weight of the polymer composition of at least one low molecular weight aromatic compound of formula (I):

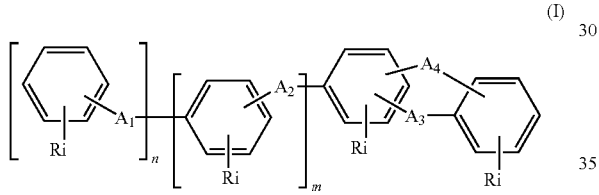

(I)

wherein:

each of $A_1$, $A_3$ and $A_4$ is independently selected from the group consisting of a bond, a sulfone group [—S(=O)$_2$—], a ketone group [—C(=O)—], an ether [—O—], and a group —C($R^5$)($R^6$)—, provided that $A_4$ is optional, each $A_2$ is independently selected from the group consisting of a bond, a sulfone group [—S(=O)$_2$—], a ketone group [—C(=O)—], an ether [—O—], a group —C($R^5$)($R^6$)—, and a group:

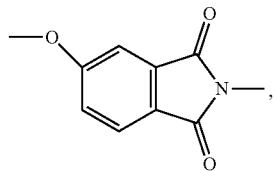

each $R^5$ and $R^6$ is independently selected from the group consisting of a hydrogen, a halogen, an optionally-halogenated alkyl, an alkenyl, an alkynyl, a phenyl, an ether, a thioether, a carboxylic acid, an ester, an amide, an imide, an alkali or alkaline earth metal sulfonate, an alkyl sulfonate, an alkali or alkaline earth metal phosphonate, an alkyl phosphonate, a —CF$_3$ group, an amine, and a quaternary ammonium;

n is an integer selected from 0 and 1;

m is an integer ranging from 0 to 32;

each R is independently selected from the group consisting of a halogen, an alkyl, an alkenyl, an alkynyl, an aryl, an ether, a thioether, a carboxylic acid, an ester, an amide, an imide, an alkali or alkaline earth metal sulfonate, an alkyl sulfonate, an alkali or alkaline earth metal phosphonate, an alkyl phosphonate, an amine, and a quaternary ammonium; and each i is an independently selected integer ranging from 0 to 5; and wherein the polymer composition comprises:

a poly(aryl ether ketone) (PAEK) component including:

a poly(aryl ether ketone) (PAEK) having a melting temperature (Tm), a crystallization temperature (Tc), and a glass transition temperature (Tg) satisfying the relationship:

$(Tm-Tc)/(Tm-Tg) \geq 0.31$, wherein the melting temperature (Tm), the crystallization temperature (Tc), and the glass transition temperature (Tg) are determined by differential scanning calorimetry according to ASTM D3418 employing a heating and cooling rate of 20° C./min; or an amorphous poly(aryl ether ketone) (PAEK) and a semi-crystalline poly(aryl ether ketone) (PAEK), and optionally a reinforcing filler;

further wherein the polymer composition exhibits a heat of fusion of at least 8 J/g.

* * * * *